Figure 1:
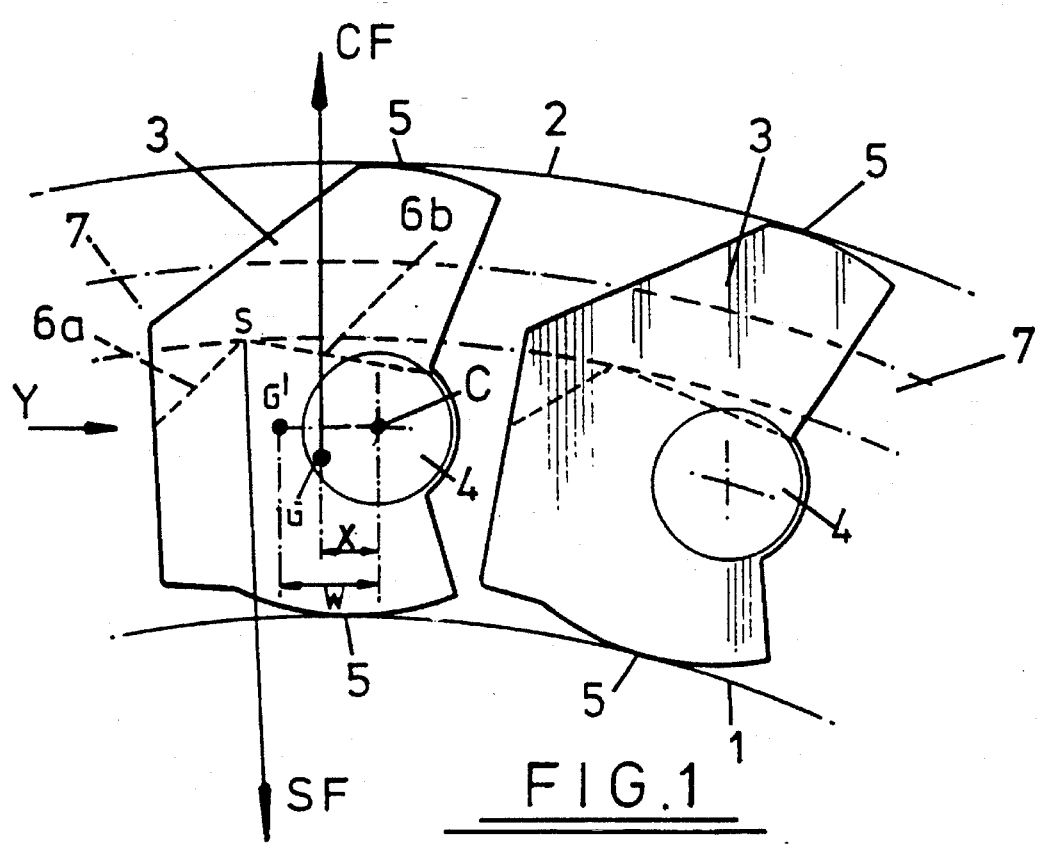

United States Patent [19]
Pratt

[11] Patent Number: 5,524,742
[45] Date of Patent: Jun. 11, 1996

[54] SPRAG CLUTCHES

[75] Inventor: Alan Pratt, Birkby, United Kingdom

[73] Assignee: Renold Plc., Manchester, United Kingdom

[21] Appl. No.: 318,603

[22] PCT Filed: Apr. 7, 1993

[86] PCT No.: PCT/GB93/00737
§ 371 Date: Dec. 27, 1994
§ 102(e) Date: Dec. 27, 1994

[87] PCT Pub. No.: WO93/21451
PCT Pub. Date: Oct. 28, 1993

[30] Foreign Application Priority Data

Apr. 8, 1992 [GB] United Kingdom ............... 9207613

[51] Int. Cl.[6] .................... F16D 41/07; F16D 43/14
[52] U.S. Cl. ................. 192/45.1; 192/41 A; 192/104 B
[58] Field of Search .................... 192/45.1, 41 A, 192/104 C, 104 B

[56] References Cited

U.S. PATENT DOCUMENTS

| 2,777,551 | 1/1957 | Banker ...................... 192/45.1 |
| 3,019,873 | 2/1962 | Ferris et al. ................. 192/45.1 |
| 3,498,429 | 3/1970 | Frakes ....................... 192/45.1 |
| 3,702,649 | 11/1972 | Giese et al. ................ 192/41 A |
| 3,997,041 | 12/1976 | Judd et al. . |
| 5,064,037 | 11/1991 | Long, Jr. . |

FOREIGN PATENT DOCUMENTS

| 3241246A1 | 5/1994 | Germany . |
| 63-285336 | 11/1988 | Japan ................... 192/41 A |

Primary Examiner—Rodney H. Bonck
Attorney, Agent, or Firm—Rockey, Rifkin and Ryther

[57] ABSTRACT

A sprag clutch having inner and outer concentric races 1, 2 with sprags 3 pivotally located between the races 1, 2. A circumferential garter spring 6 locates over the sprags 3 to bias them to a wedging position. Relative rotation of the races 1, 2 in one direction causes a centrifugal force CF to act on each sprag 3 to pivot away from contact with the outer race 2. The center of gravity G of each sprag 3 is located radially inwards of its center of rotation C such that when the sprag 3 pivots the centrifugal couple CF increases to overcome the increased tension couple SF of the garter spring to allow a snap action lift off of each sprag 3. The perpendicular distance of the center of gravity from the pivot center of each sprag increases during pivoting to cause an increase in the centrifugal couple. At the same time the perpendicular distance of the pivot point of action of the resilient mean from the pivot center decreases during pivoting. The snap action substantially reduces the contact time between the sprags 3 and the outer race 2 and hence wear is reduced.

5 Claims, 1 Drawing Sheet

SPRAG CLUTCHES

The present invention relates to sprag clutches comprising an inner race and an outer race and sprags located between the races.

This invention is particularly concerned with centrifugal lift off sprag clutches which are well known in the art.

Sprag clutches which use a centrifugal lift off action to effect lift off of the sprags from the outer race are known. The sprags are biased into engagement with both races to effect a wedging action preventing rotation of the races relative to each other in a first direction. Relative rotation of the races in a second direction (overrunning) is permitted. At a certain relative angular velocity in the second direction the centrifugal force acting on the sprags, due to the unbalanced mass created by the asymmetric geometry, increases to a magnitude which causes the sprags to pivot about an axis such that a clearance develops between the sprags and the outer raceway.

The advantage of centrifugal lift off clutches is that the wear of the sprags against the contacting race is reduced during overrunning. However, as the sprags pivot to lift off a race the bias force urging the sprags into the locked position tends to increase. This results in an extended lift off time over a range of angular velocity during which the centrifugal force overcomes the increasing resilient bias force and hence a degree of wear still occurs.

It is an object of the present invention to obviate or mitigate the aforesaid disadvantage.

In accordance with the present invention there is provided a sprag clutch comprising a race, a plurality of sprags held pivotally in a cage concentric with said race, said sprags having a race engaging surface, and resilient means urging said sprags into contact with said race by imparting an urging couple to said sprags at a point of action whereby on attempted rotation of said cage in a first direction relative to said race said sprags move to an engaging position to prevent said rotation and on attempted rotation of said cage and sprags in a second direction relative to said race a centrifugal force acts on each of the sprags imparting a centrifugal couple to pivot it to a disengaged position to allow rotation of said cage and sprags, the centre of gravity of each sprag being so disposed that as each sprag pivots the centrifugal couple increases at a greater rate than the urging couple, wherein the centre of gravity of each sprag is disposed radially inwardly of a fixed pivot centre of the sprag so that the perpendicular distance of the centre of gravity from the pivot centre increases during the pivoting of each sprag causing a corresponding increase in the centrifugal couple, and the perpendicular distance of the point of action of said resilient means from the pivot centre decreases during said pivoting.

Preferably the clutch further comprises inner and outer races between which the sprags and cage are disposed, wherein in said engaged position the sprags are in contact with both said inner and outer races and in said disengage position the sprags pivot out of contact with one of said races.

The inner race may be part of the sprag clutch or may be formed on a shaft or the like on which the clutch is located.

Preferably the resilient means is a garter spring disposed circumferentially around the sprags which is preferably located in a recess in each sprag.

Preferably the garter spring is a tension spring which acts in the recess disposed radially outward of the pivot centre of the sprag.

Preferably the sprags pivot out of contact with the outer race.

Figure 2:
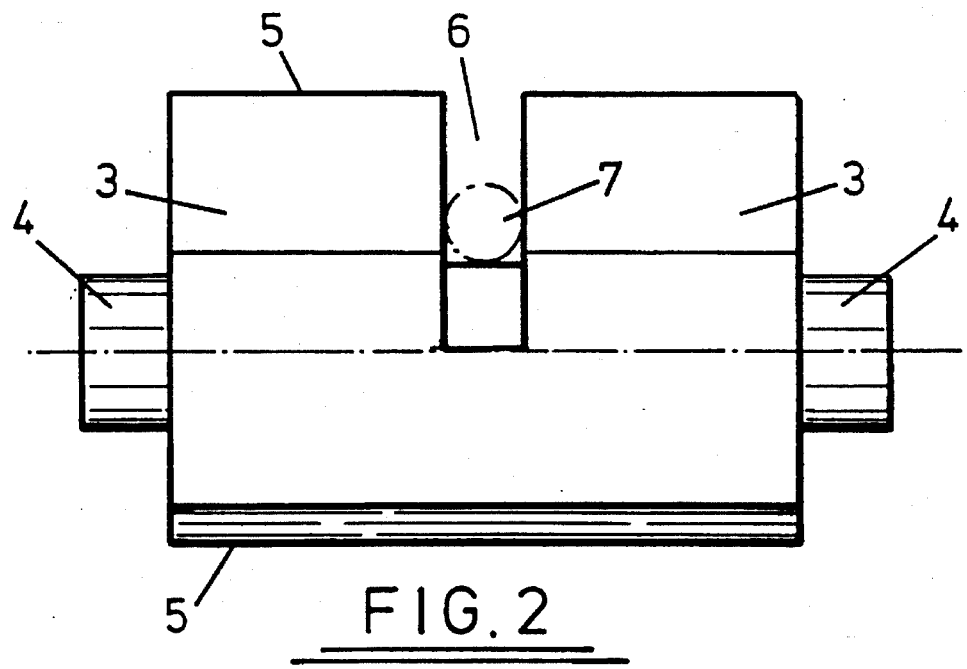

A specific embodiment of the present invention will now be described with reference to the accompanying drawings in which:

FIG. 1 is a fragmentary view of a sprag clutch indicating forces acting on each sprag; and FIG. 2 is an end view of a sprag of FIG. 1 in the direction of arrow Y.

Referring to FIG. 1 there is shown part of a sprag clutch having inner and outer concentric races 1,2 rotatable about a central axis (not shown). In the annular space between the races 1,2 is disposed a plurality of sprags 3 each pivotable on trunnions 4 about an axis (into the page in FIG. 1) through point C. For illustrative purposes, only two sprags 3 are shown in FIG. 1. The trunnions 4 extend laterally on either side of the sprag 3 and are received in openings in a cage (not shown).

As is well known in the art, the sprags 3 have arcuate race engaging surfaces 5 and are asymmetrically shaped. The geometry of the sprag 3 provides for a circumferentially unbalanced mass as a result of the centre of gravity G being spaced apart from the centre of rotation C.

Each sprag 3 has a recess 6 which extends radially inward from the outer surface of the sprag 3 which recess 6 is designed to receive a circumferential garter spring 7. The bottom surface of the recess 6 comprises two inclined surfaces 6a,6b meeting at an edge S. It is at this edge S that the garter spring 7 contacts the sprag 3.

The operation of the sprag clutch will be described with reference to FIG. 1. For the purpose of clarity, the operation is described with the outer race 2 remaining stationary and the inner race 1 rotating relative to it. The sprags 3 and their cage rotate with the inner race 1.

In operation, the garter spring 6 urges (indicated by arrow SF) each sprag 3 to pivot anti-clockwise into contact with both the races 1,2. If an attempt is made to rotate the inner race 1 clockwise relative to the outer race 2 the friction forces between the sprag surfaces 5 and the race 1,2 surfaces cause the sprag 3 to rotate anti-clockwise into the wedging position such that further rotation is prevented.

When the inner race 1 rotates anti-clockwise the sprag 3 and cage assembly rotate with it and a centrifugal force (indicated by arrow CF) acts radially outward at the centre of gravity G of each sprag 3 causing a clockwise couple. The couple CF has the effect of pivoting the sprag 3 clockwise about its centre of rotation C, relative to the cage and races 1,2. The centrifugal force couple CF acts against the couple SF imparted by the garter spring and at a predetermined angular speed of rotation it becomes large enough to overcome the spring force SF and the sprag 3 begins to pivot. In so pivoting the sprag 3 "lifts off" the outer race 2.

The centre of gravity G of each sprag 3 is designed to be located radially inward of the position of the centre of rotation C. As the sprag 3 pivots clockwise during lift-off the garter spring 6 is expanded by virtue of point S moving radially outwards. This has the effect of increasing the spring tension couple SF applied to the sprag 3 which the centrifugal couple CF must overcome to achieve lift-off. As the sprag 3 pivots the centre of gravity moves from G to G'. In so doing the perpendicular distance X between the centre of rotation C and the centre of gravity G increases up to a distance W which causes the centrifugal couple CF to increase. The increase in the centrifugal couple CF occurs at a greater rate than the spring force couple SF as the sprag 3 pivots causing the sprag 3 to pivot in a "snap action" to lift off the outer race 2.

In this manner there is a rapid lift off motion over a very small range of angular velocity. The snap action reduces to a minimum the wear between the sprag 3 and the outer race 2 during overrunning.

It is to be understood that the centrifugal couple is best sustained through the pivoting of the sprag if the centre of gravity of the sprag is positioned as above described. However, the essential requirement is that the increase in the centrifugal couple occurs at a greater rate than the spring force couple.

A consequence of the snap action at lift-off is that the spring couple instantaneously reduces to a value below that of the centrifugal couple which triggered it. Thereafter the speed must be reduced below the lift-off speed for the centrifugal couple to fall below this reduced spring couple to allow a "lift-on" action to commence. In this manner the lift-on of the sprag back to the race occurs at a lower speed of rotation than lift-off.

Viscous drag which occurs in the lubricant between the sprag and the outer race assists the lift-off action and reduces both lift-off and lift-on speeds. The trunnion is positioned to optimise this benefit.

The viscous drag benefit and the difference between lift-off and lift-on speeds are particularly beneficial in variable speed drives in which the speed variation can fall below the initial lift-off speed without the clutch re-engaging.

For example, using one particular sprag clutch design the speed required to initiate the lift-off action is 620.7 r.p.m. The sprag lifts off in a snap action as above described by pivoting through 30°. Once the sprag has lifted off any rotational speed above 593.3 r.p.m. will generate a centrifugal couple greater than the spring couple so the sprag is maintained in the lifted off position. Once the speed is reduced below 593.3 r.p.m. the sprag "lifts-on" to the race. The difference between the lift-off and lift-on speeds can be varied by moving the position of the centre of gravity G and the spring contact points and altering the spring characteristics.

I claim:

1. A sprag clutch comprising a race, a plurality of sprags held pivotally in a cage concentric with said race, said sprags having a race engaging surface, and resilient means urging said sprags into contact with said race by imparting an urging couple to said sprags at a point of action whereby on attempted rotation of said cage in a first direction relative to said race said sprags move to an engaging position to prevent said rotation and on attempted rotation of said cage and sprags in a second direction relative to said race a centrifugal force acts on each of the sprags imparting a centrifugal couple to pivot it to a disengaged position to allow rotation of said cage and sprags, the centre of gravity of each sprag being so disposed that as each sprag pivots the centrifugal couple increases at a greater rate than the urging couple, wherein the centre of gravity of each sprag is disposed radially inwardly of a fixed pivot centre of the sprag so that the perpendicular distance of the centre of gravity from the pivot centre increases during the pivoting of each sprag causing a corresponding increase in the centrifugal couple, and the perpendicular distance of the point of action of said resilient means from the pivot centre decreases during said pivoting.

2. A sprag clutch according to claim 1, comprising inner and outer races between which the sprags and cage are disposed, wherein in said engaged position the sprags are in contact with both said inner and outer races and in said disengaged position the sprags pivot out of contact with one of said races.

3. A sprag clutch according to any preceding claim wherein the resilient means is a garter spring disposed circumferentially around the sprags and located in a recess in each sprag.

4. A sprag clutch according to claim 3, wherein the garter spring is a tension spring which acts in the recess disposed radially outward of the pivot centre of the sprag.

5. A sprag clutch according to any one of claims 3 wherein the sprags pivot out of contact with said outer race.

* * * * *